United States Patent [19]

Flipot et al.

[11] 3,836,431
[45] Sept. 17, 1974

[54] NUCLEAR FUEL RODS HAVING END PLUGS WITH BORES THERETHROUGH SEALED BY FRANGIBLE MEMBRANES

[75] Inventors: Alfred-Jean Flipot, Geel; Paul Papeleux, Angleur; Ivan Lafontaine, Geel, all of Belgium

[73] Assignee: Belgonucleaire and Centre d'Etude de L'Energie Nucleaire, Brussels, Belgium

[22] Filed: Apr. 26, 1972

[21] Appl. No.: 247,723

[30] Foreign Application Priority Data
May 4, 1971 Belgium .............................. 103005

[52] U.S. Cl. ...................... 176/79, 176/90, 220/27
[51] Int. Cl. ............................................. G21c 3/10
[58] Field of Search .................. 176/79, 80, 90, 68; 220/27; 215/42; 217/111

[56] References Cited
UNITED STATES PATENTS

| | | | |
|---|---|---|---|
| 739,058 | 9/1903 | Charles | 217/111 |
| 2,144,460 | 1/1939 | Miller | 217/111 X |
| 3,197,381 | 7/1965 | Blake | 176/90 |
| 3,509,879 | 5/1970 | Bathish et al. | 215/42 X |
| 3,647,623 | 3/1972 | Hepps et al. | 176/79 |

FOREIGN PATENTS OR APPLICATIONS

| | | | |
|---|---|---|---|
| 10,936 | 6/1961 | Taiwan | 176/79 |
| 1,209,673 | 1/1966 | Germany | 176/79 |
| 968,039 | 8/1964 | Great Britain | 176/68 |

*Primary Examiner*—Carl D. Quarforth
*Assistant Examiner*—Roger S. Gaither
*Attorney, Agent, or Firm*—Ostrolenk, Faber, Gerb & Soffen

[57] ABSTRACT

This invention relates to a cylindrical, pressurized, nuclear reactor fuel rod sealed at one end by an end plug having a frangible membrane sealing a narrow bore extending through said plug.

1 Claim, 1 Drawing Figure

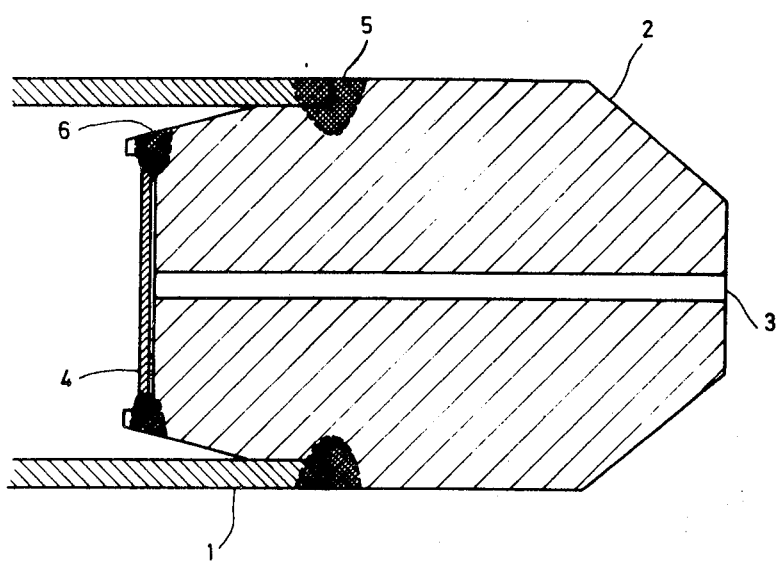

NUCLEAR FUEL RODS HAVING END PLUGS WITH BORES THERETHROUGH SEALED BY FRANGIBLE MEMBRANES

This invention relates to nuclear fuel rods and more particularly to fuel rods with an internal gas pressure.

Nuclear fuel rods generally comprise a metallic casing, containing the fuel and closed at both ends by plugs so as to form a gas-tight container. When the reactor is under operation, the casing is subjected to the coolant pressure. In case deformations occur, the fuel rod no longer presents a sufficient mechanical stability under irradiation.

In order to avoid these deformations it has been proposed to put the rod under an internal gas pressure by filling it with a gas under pressure. The pressurization however necessitates a gas-tight weld which must be realized under a pressure corresponding with the internal rod pressure.

As the welding of the plug on the casing can hardly be realized under high pressure, one generally uses a plug provided with an orifice of small cross-section, welded on the casing before the pressurization. Afterwards, the rod is pressurized through the orifice which is finally closed by welding. As the specifications are rather severe and as the gas inside the rod must have a rather high purity degree, one is obliged to purge the atmosphere of the rod before admitting the pressurization gas. Purging through an orifice of small cross-section is however time wasting and, consequently, rather expensive.

The present invention proposes a method for closing a pressurized nuclear fuel rod as well as a plug for such a rod, allowing to avoid said disadvantages.

According to the invention, the plug is provided with an orifice of small section, temporarily closed by a metallic membrane, and welded on the casing in an enclosure containing the same gas that will be used for the pressurization of the rod, after having purged its atmosphere.

The rod may then be removed from the enclosure in which the plug has been welded, temporarily stored, or placed directly in the pressurization enclosure and put under pressure without having to purge again on the admission of the pressurization gas. Indeed, the metallic membrane prevents the entry of any undesired gas.

When pressurizing the rod, the metallic membrane breaks under the influence of the gas pressure. After pressurization, the rod is closed by localized fusion of the metal surrounding the orifice of small section.

It is evident that if the localized fusion of the metal surrounding the orifice would not allow an acceptable closing of the rod, one might provide a suitable metal supply source.

The plug according to the invention is thus provided with a pressurization channel provisionally closed by a metallic membrane welded to the rod and ensuring its tightness. The membrane will be chosen in function of the pressurization pressure, because it should break during the pressurization of the rod. Preferably, the metal used for the membrane will be the same as the one used for the casing and the plug.

The invention will be described in more detail hereafter, with the aid of a non-limitative example under reference to the accompanying drawing which represents a schematic view of a plug according to the invention.

The drawing shows an extremity of a fuel rod consisting of a casing 1 in stainless steel already closed at the other end. The casing is closed by a plug 2 provided with a pressurization channel 3, closed on its inner side by a metallic membrane 4. The plug is welded on the casing 1 with the help of a welding bead 5. The FIGURE shows moreover a weld 6 tightly fixing the membrane 4 on the periphery of the plug.

The method according to the invention could be schematized as follows:

a. one introduces the rod closed at one end and filled with fuel into a standard welding enclosure. In this enclosure, one first removes the air contained in the fuel rod as well as in the enclosure by means of a vacuum pump. Afterwards one fills the enclosure with helium, which gas will be used for the pressurization of the rod, at a pressure close to the atmospheric pressure. One then places the plug according to the invention on the rod and effects the welding of the plug on the casing. The rod is thus tightly closed and may thus be handled in the open air;

b. one then introduces the rod into a pressurization enclosure which is purged before admitting helium at a pressure of 40 kg/cm$^2$. This helium pressure breaks the metallic membrane and thus opens the orifice of the plug allowing for the pressurization of the rod. The orifice of the plug is then closed by localized fusion of the metal surrounding the orifice by means of the TIG welding method.

Besides the advantage of avoiding the repeated purge of the rod, the invention allows to decontaminate the rod after the welding of the plug on the casing, as the membrane ensures its temporary tightness. This allows, for instance, to effect non-destructive controls on the rods before their pressurization.

Another advantage lies in the fact that the pressurization enclosure may be maintained at a contamination level of substantially zero. The contamination danger may be completely avoided by placing, for instance, a metallic filter in the channel.

It is evident that the example described above is not limitative at all and that diverse modifications may be brought to it.

So, for instance, the plug must not necessarily consist of stainless steel, and the form of the orifice must not be such as illustrated. Moreover the plug may have more than one single orifice. Moreover the closing of the plug by fusion may be obtained with the help of other methods than TIG welding, thus for instance plasma welding, resistance welding, laser welding, etc., may also be used.

We claim:

1. A cylindrical, pressurized, nuclear fuel rod having a casing with one open end and containing a nuclear fuel therein; a solid, elongated end plug having an outer end and a generally flat inner end; said plug being attached to said casing and extending substantially into said casing past said open end thereof, with said plug inner end being within said casing and said plug outer end being without said casing; said plug inner and outer ends being generally opposed to each other; said plug having an outer diameter conforming substantially to a diameter of said casing so as to be generally contiguous therewith; said plug being sealingly welded around the periphery of said plug to said casing at the open end and about the circumference of said casing; said plug defining an inner portion within said casing, defining an outer portion facing outwardly from the open end of said casing; a narrow bore extending through said plug and through its said inner and outer ends; said plug inner portion being chamfered narrower toward said flat inner end to enable said plug to be fitted into said casing; a frangible membrane being provided and sealingly welded to said flat plug inner end by a circumferential weld that is spaced from said plug bore; said membrane passing across and sealing said bore; said membrane being comprised of a thin, flat, metal sheet; wherein the membrane is to be broken by the introduction of a gas into said fuel rod from the outside and through said bore in said plug, and thereafter said bore is to be sealed at said plug outer end.

* * * * *